United States Patent
MacInnis et al.

(10) Patent No.: US 7,525,599 B2
(45) Date of Patent: Apr. 28, 2009

(54) SYSTEM AND METHOD FOR BLENDING OF SPATIAL INTERPOLATION AND WEAVING

(75) Inventors: Alexander MacInnis, Lake Oswego, OR (US); Chenghui Feng, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 696 days.

(21) Appl. No.: 11/272,113

(22) Filed: Nov. 10, 2005

(65) Prior Publication Data

US 2007/0103587 A1 May 10, 2007

(51) Int. Cl.
*H04N 7/01* (2006.01)
(52) U.S. Cl. .................. 348/448; 348/441; 348/452
(58) Field of Classification Search .......... 348/448, 348/441, 451, 452, 458, 459, 701, 700; *H04N 7/01, H04N 11/20*
See application file for complete search history.

(56) References Cited

U.S. PATENT DOCUMENTS 6,680,752 B1 * 1/2004 Callway et al. ............. 348/448
6,690,427 B2 * 2/2004 Swan ......................... 348/448

* cited by examiner

*Primary Examiner*—Sherrie Hsia
(74) *Attorney, Agent, or Firm*—McAndrews, Held & Malloy, Ltd.

(57) ABSTRACT

A method for processing video information may include calculating a plurality of motion indicators for a plurality of pixels in a current field and at least one corresponding plurality of pixels in at least one adjacent field. At least one of the plurality of motion indicators may indicate an amount of weave artifacts that are created, if the plurality of pixels in the current field are woven with the corresponding plurality of pixels in the at least one adjacent field. The calculated plurality of motion indicators may be combined to generate a blend control value that indicates an amount of weaving and spatial interpolation that is to be done for a current output sample value. The current output sample value may be generated based on the generated blend control value.

20 Claims, 8 Drawing Sheets

SYSTEM AND METHOD FOR BLENDING OF SPATIAL INTERPOLATION AND WEAVING

RELATED APPLICATIONS

This application is related to the following applications, each of which is hereby incorporated herein by reference in its entirety for all purposes:

U.S. patent application Ser. No. 11/254,450, filed Oct. 20, 2005;

U.S. patent application Ser. No. 11/254,262, filed Oct. 20, 2005;

U.S. patent application Ser. No. 11/272,116, filed Nov. 10, 2005;

U.S. patent application Ser. No. 11/272,112, filed Nov. 10, 2005;

U.S. patent application Ser. No. 11/270,999, filed Nov. 10, 2005; and

U.S. Provisional Patent Application Ser. No. 60/687,674, filed Jun. 06, 2005.

FIELD OF THE INVENTION

Certain embodiments of the invention relate to processing of video. More specifically, certain embodiments of the invention relate to a system and method for blending of spatial interpolation and weaving, which may be utilized for deinterlacing, for example.

BACKGROUND OF THE INVENTION

During interlacing, pictures that form a video frame may be captured at two distinct time intervals. These pictures, which may be referred to as fields and which form the video frame, comprise a plurality of ordered lines. During one of the time intervals, video content for even-numbered lines may be captured, while at a subsequent time interval, video content for odd-numbered lines may be captured. The even-numbered lines may be collectively referred to as a top field, while the odd-numbered lines may be collectively referred to as a bottom field. On an interlaced display, the even-numbered lines may be presented for display on the even-numbered lines of a display during one time interval, while the odd-numbered lines may be presented for display on the odd-numbered lines of the display during a subsequent time interval.

With progressive displays, however, all of the lines of the display are displayed at one time interval. During deinterlacing of interlaced video, a deinterlacing process may generate pictures for display during a single time interval. Deinterlacing by combining content from adjacent fields, which is known as weaving, may be suitable for regions of a picture that are characterized by little or no object motion or lighting changes, known as inter-field motion. Displaying both the top field and bottom field at the same time interval may be problematic in cases where the video content comprises significant motion or significant lighting changes. Objects that are in motion are at one position when the top field is captured and another position when the bottom field is captured. If the top field and the bottom field are displayed together, a comb-like, or jagged edge affect may appear with the object. This is referred to as a weave artifact.

Alternatively, deinterlacers may generate a picture for progressive display by interpolating missing lines in a field from adjacent and surrounding lines. This is known as spatial interpolation, or "bobbing". While spatial interpolation avoids weave artifacts in regions with high inter-field motion, spatial interpolation loses vertical detail and may result in a blurry picture.

Conventional methods for deinterlacing interlaced video may produce weave artifacts, for example by incorrectly biasing deinterlacing decisions towards weaving when spatial interpolation may be more appropriate. Similarly, conventional deinterlacing methods may often times bias deinterlacing decisions towards spatial interpolation when weaving may be a more appropriate method for deinterlacing. Furthermore, conventional deinterlacing methods may utilize a determined amount of weaving and spatial interpolation, or "bobbing", which may, however, result in visible artifacts such as contouring artifacts.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and method for blending of spatial interpolation and weaving, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for deinterlacing interlaced video signals utilizing blending of spatial interpolation and weaving. In one embodiment of the invention, a plurality of pixel motion indicators may be calculated for a plurality of pixels in a current field and a corresponding plurality of pixels in an adjacent field. The pixel motion indicators may indicate, for example, an amount of motion between the plurality of pixels. For example, a polarity change count (PCC) may be utilized to measure an amount of weave artifacts that are created if the plurality of pixels in the current field is weaved with the plurality of pixels in the adjacent field. A two-field difference value and/or a vertical gradient value may be utilized to measure motion, such as vertical motion, of video content between adjacent fields. Furthermore, a static region indicator value may be utilized to indicate absence of motion of pixels between a plurality of adjacent fields. Each indicator may be calculated separately for each output sample location. The calculated plurality of pixel motion indicators may be blended to generate a blend control value. A current output sample value may then be generated based on the blend control value.

Figure 1:
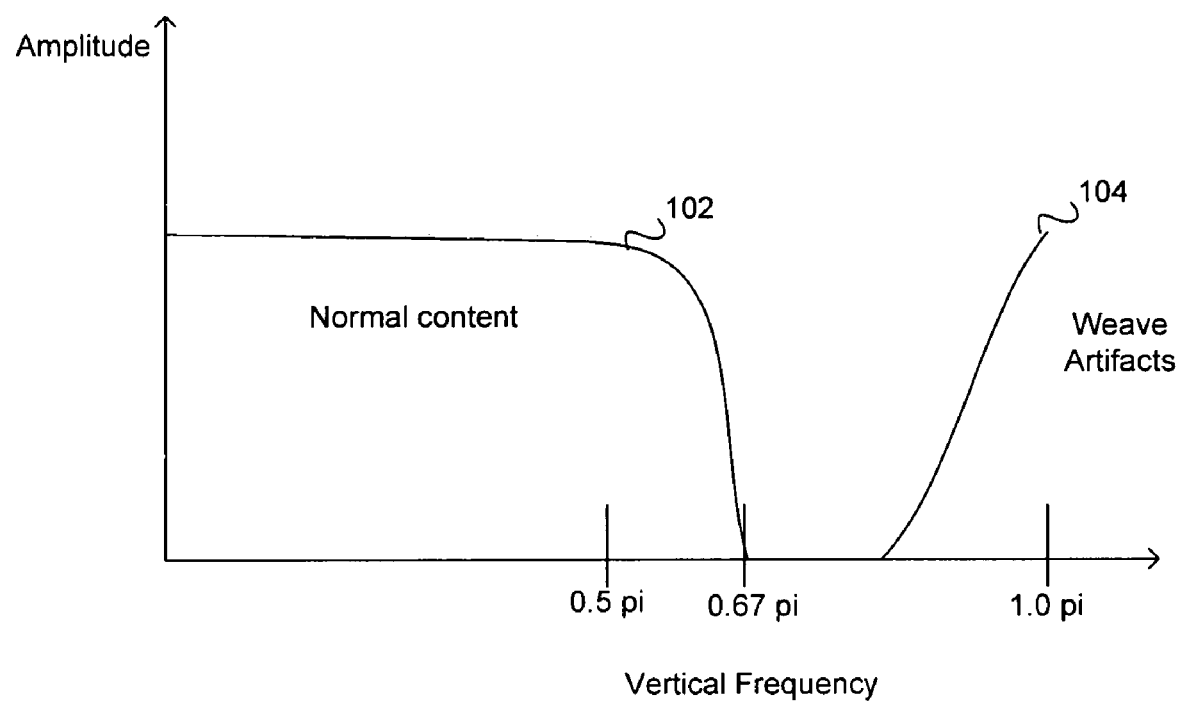
FIG. 1 is a graph illustrating exemplary spectra of video content vertical detail and bad weave artifacts that may be utilized in accordance with an embodiment of the invention.

FIG. 1 is a graph 100 illustrating exemplary spectra of video content vertical detail with bad weave artifacts that may be utilized in accordance with an embodiment of the invention. Referring to FIG. 1, the exemplary spectra of video content vertical detail may comprise a normal video content vertical detail spectrum 102, and bad weave artifacts spectrum 104. The normal video content vertical detail spectrum 102 lies at a vertical frequency that is less that or equal to approximately 0.67 pi, while the bad weave artifacts spectrum 104 lies at a vertical frequency that is greater than or equal to approximately 0.8 pi. The vertical Nyquist bandwidth limit for frame sampled video pictures may be referred to as pi.

One goal of deinterlacing is to mitigate or eliminate the bad weave artifacts spectrum 104. In an exemplary aspect of the invention, a plurality of pixel motion indicators may be calculated for a plurality of pixels in a current field and a corresponding plurality of pixels in one or more adjacent fields. The video fields may then be deinterlaced utilizing weaving and/or spatial interpolation based on the calculated plurality of pixel motion indicators so that bad weave artifacts associated with the bad weave artifacts spectrum 104 may be avoided.

Motion may be detected and spatial interpolation may be conditionally utilized in order to prevent the occurrence of visible weave artifacts, or "bad weaves." The conditional use of spatial interpolation may be used in lieu of weaving where significant inter-field differences are detected. For static imagery with high vertical frequency detail but no objectionable flicker on an interlaced display, the vertical bandwidth may be determined by the Kell factor, which may be considered to be between 0.6 and 0.7 as illustrated in FIG. 1. That is, the maximum vertical spectral component that results in perceived detail and not perceived flicker is between 0.6 and 0.7 of the frame Nyquist limit. The Nyquist limit for any one field of video may be calculated as one half the frame Nyquist limit, since fields have half the vertical sample rate of frames. The frame Nyquist limit may also be referred to as 1.0 pi.

As illustrated via the bad weave artifacts spectrum 104 of FIG. 1, bad weaves tend to produce significant spectral components at 1.0 pi. Consider, for example, the case of a white rectangular object moving against a black background, in interlaced video. In any one field, if the missing lines were filled in using the previous field, i.e. pure weaving, a distinct comb would appear at the left and right edges of the white object, which may be representative of bad weave artifacts. A vertical sequence of samples through the artifacts may comprise alternating black and white pixels, which may be indicative of high amplitude signal at 1.0 pi. The bad weave artifacts may comprise spectral components that are higher in frequency than Kell-limited vertical detail, as illustrated in FIG. 1.

Figure 2A:
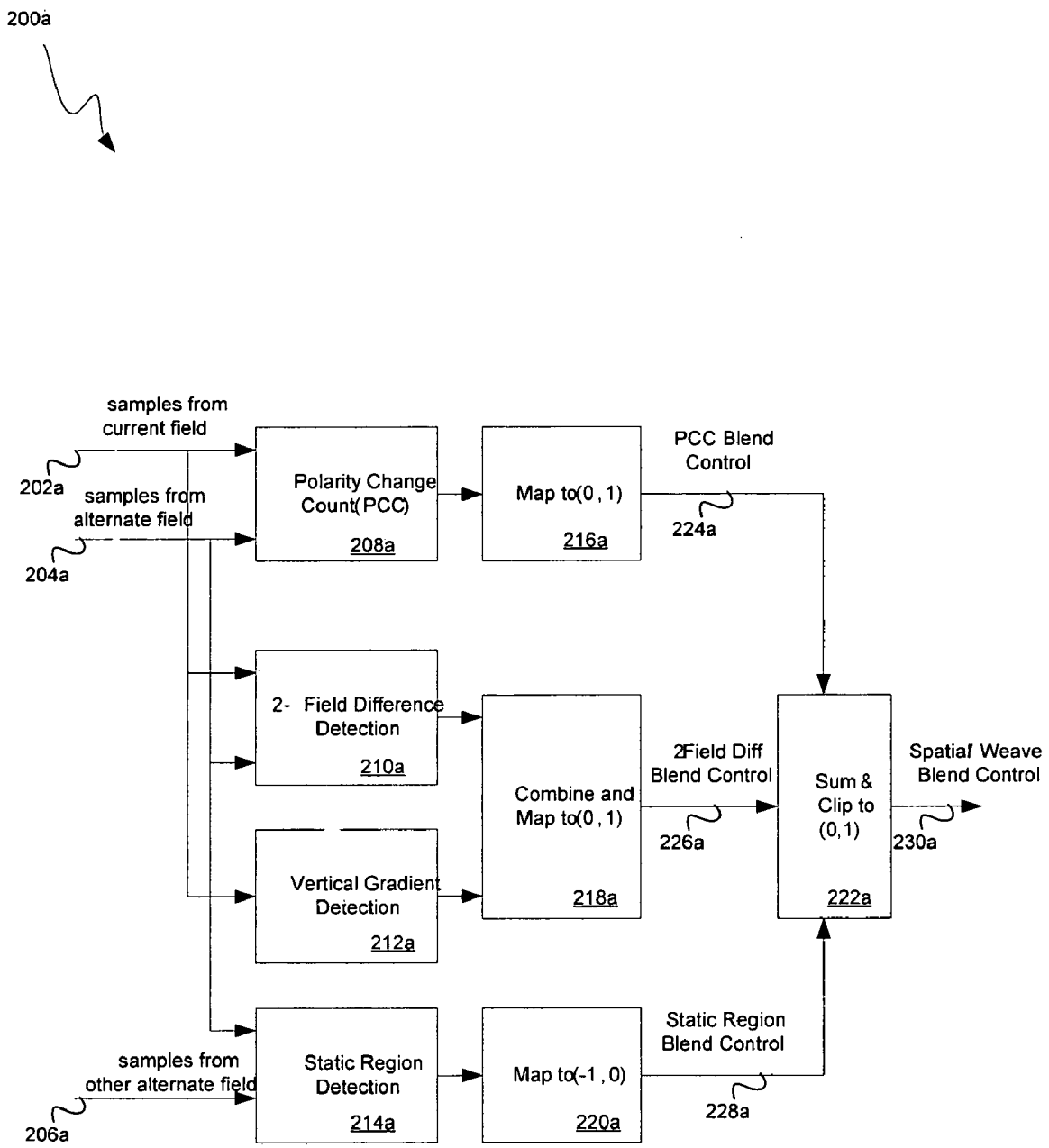
FIG. 2A is a block diagram illustrating a system for processing video information utilizing blending of spatial interpolation and weaving, in accordance with an embodiment of the invention.

FIG. 2A is a block diagram illustrating a system for processing video information utilizing blending of spatial interpolation and weaving, in accordance with an embodiment of the invention. Referring to FIG. 2A, the system 200a may comprise a polarity change count (PCC) calculation block 208a, a two-field difference calculation block 210a, a vertical gradient calculation block 212a, a static region calculation block 214a, mapping blocks 216a, ..., 220a, and a blend control calculation block 222a.

The polarity change count (PCC) calculation block 208a may comprise suitable circuitry, logic, and/or code and may be adapted to acquire pixel samples 202a from a current field and pixel samples 204a from an alternate field and to calculate a PCC value for the plurality of pixel samples 202a from the current field. The PCC value may indicate an amount of weave artifacts that are created if the plurality of pixels 202a in the current field is weaved with the plurality of pixels 204a in the alternate field. The calculated PCC value may be communicated from the PCC calculation block 208a to the mapping block 216a for further processing.

The two-field difference calculation block 210a may comprise suitable circuitry, logic, and/or code and may be adapted to acquire pixel samples 202a from a current field and pixel samples 204a from an alternate field and to calculate a two-field difference value between corresponding in-phase pixel samples from the current field and the alternate field. The two-field difference value may indicate an amount of motion, for example vertical motion, between the corresponding pixels in the current field and the alternate field. The calculated two-field difference value may be communicated from the two-field difference calculation block 210a to the mapping block 218a for further processing.

The vertical gradient calculation block 212a may comprise suitable circuitry, logic, and/or code and may be adapted to acquire pixel samples 202a from the current field and to calculate a vertical gradient of adjacent pixels from the current field. The vertical gradient value may be indicative of an edge with a horizontal component among adjacent pixels within the current field. The calculated vertical gradient values may be communicated from the vertical gradient calculation block 212a to the mapping block 218a for further processing.

The static region calculation block 214a may comprise suitable circuitry, logic, and/or code and may be adapted to acquire pixel samples 204a from the alternate field and pixel samples 206a from a second alternate field and to calculate a static region indicator value for the current field. The static region indicator value may be indicative of absence of motion between a plurality of adjacent fields. The calculated static region indicator value may be communicated from the static region calculation block 214a to the mapping block 220a for further processing.

The mapping blocks 216a, ..., 220a may each comprise suitable circuitry, logic, and/or code and may be adapted to transform the calculated pixel motion indicators received from the polarity change count calculation block 208a, the two-field difference calculation block 210a, the vertical gradient calculation block 212a, and the static region calculation block 214a, respectively, into blend control values 224a, ..., 228a, respectively, within a determined range. The blend control values 224a, ..., 228a may be communicated to the blend control calculation block 222a, which may generate a spatial/weave blend control value 230a. The spatial/weave blend control value 230a may be within a determined range and may be utilized to determine whether spatial interpolation, weaving, or a combination thereof may be utilized for deinterlacing the pixel samples 202a from the current field.

In operation, the PCC value received from the PCC calculation block 208a may be mapped to a PCC blend control value 224a which may be within a determined range, such as (0, 1), for example. The PCC blend control value 224a may be indicative of an amount of weave artifacts that are created if the plurality of pixels 202a in the current field is weaved with the plurality of pixels 204a in the adjacent field. The two-field difference value received from the two-field difference calculation block 210a and the pixel difference values from the vertical gradient calculation block 212a may be combined by the mapping block 218a to generate a two-field difference blend control value 226a. The two-field difference blend control value 226a may be indicative of an amount of motion, such as visible vertical motion, for example, between pixels between the current field and the adjacent field.

The two-field difference blend control value 226a may be within a determined range, such as (0, 1), for example. The static region indicator value received from the static region detection block 214a may be mapped to a static region blend control value 228a, which may be within a determined range, such as (−1, 0), for example.

The conversion of the pixel motion indicators received from the polarity change count calculation block 208a, the two-field difference calculation block 210a, the vertical gradient calculation block 212a, and the static region calculation block 214a to blend control values 224a, . . . , 228a within a determined range, may be achieved via non-linear functions, such as a scaling function and/or a clipping function, or via a look-up table. The calculated spatial/weave blend control value 230a may be indicative of the presence of visible vertical or horizontal motion of video content between adjacent fields, or in the alternative, absence of such motion. Accordingly, the spatial/weave blend control value 230a may be utilized to determine whether to deinterlace pixels from video fields 202a and 204a utilizing weaving, if the spatial/weave blend control value 230a is 0 or close to 0, spatial interpolation, if the spatial/weave blend control value 230a is 1 or close to 1, or a combination of weaving and spatial interpolation if the spatial/weave blend control value 230a is between 0 and 1.

Figure 2B:
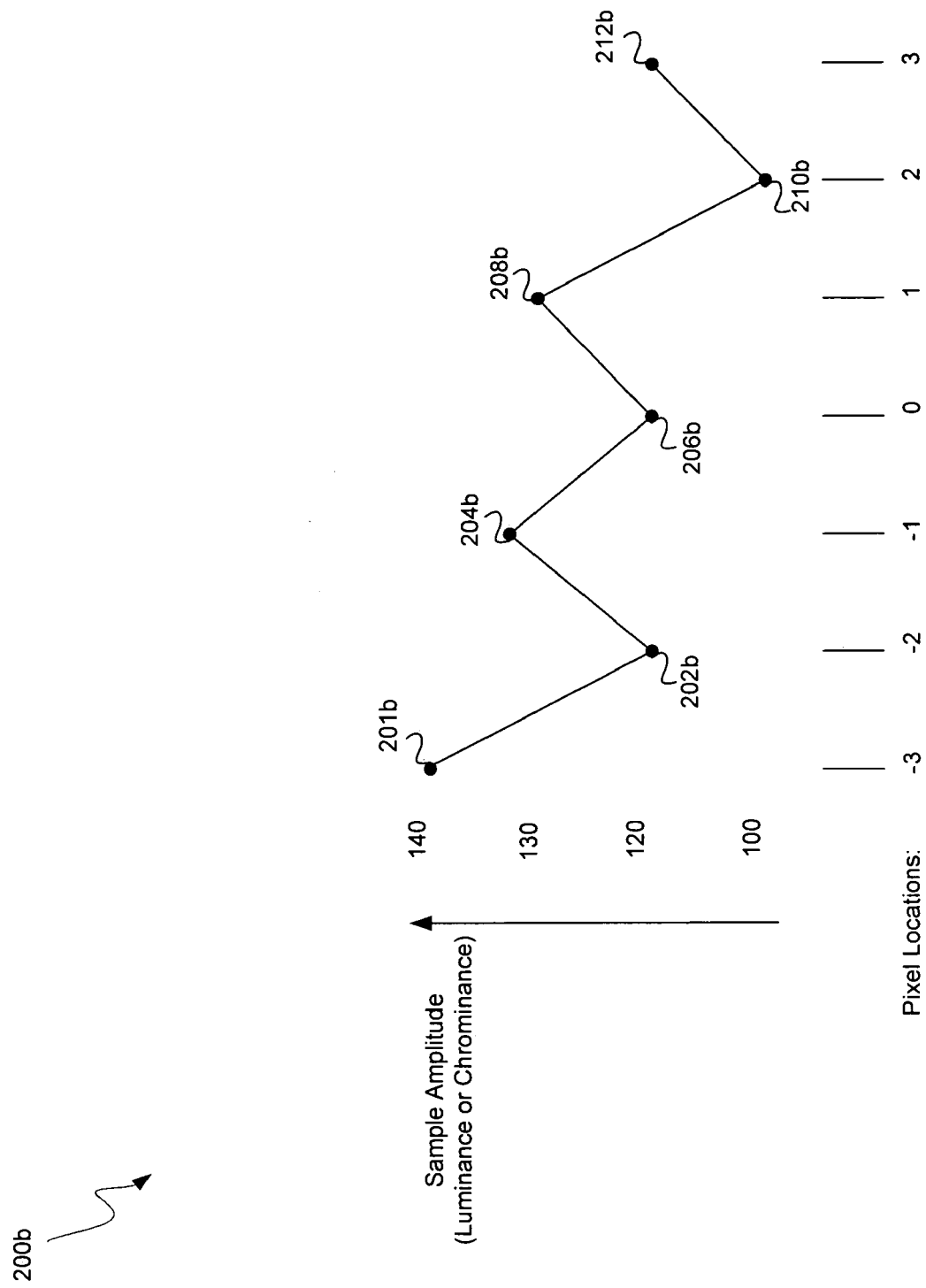
FIG. 2B is a diagram illustrating a plurality of samples for polarity change count (PCC) measurement, in accordance with an embodiment of the invention.

FIG. 2B is a diagram illustrating a plurality of samples for polarity change count (PCC) measurement, in accordance with an embodiment of the invention. Referring to FIG. 2B, there is shown a graph 200b illustrating PCC measurement for a plurality of adjacent pixel samples 201b, . . . , 212b, which are selected from different fields. For example, pixel samples 201b, 204b, 208b and 212b may be selected from a current field, and pixel samples 202b, 206b, and 210b may be selected from a corresponding previous video field. The sample pixel locations corresponding to pixels 201b, . . . , 212b may be −3, . . . 3, along the vertical video axis, with location 0 being the location of the current output sample location 206b. The amplitude for the pixel samples 201b, . . . , 212b may range from 100 to 140, for example, as illustrated along the vertical axis in FIG. 2B. In one aspect of the invention, the pixel sample amplitude may comprise luminance, or brightness, amplitude of the sample pixels. In another aspect of the invention, the pixel sample amplitude may comprise chrominance amplitude of the sample pixels, or a combination of luminance and chrominance amplitudes. The samples 201b, 204b, 208b and 212b may correspond to the plurality of pixel samples 204a from a current field, and pixel samples 202b, 206b, and 210b may correspond to the plurality of pixel samples 202a in an alternate field, as illustrated in FIG. 2A with regard to calculation of the PCC blend control value 224a.

A polarity change count (PCC) for pixel samples 201b, . . . , 212b may be calculated by counting the number of reversals in the difference polarities between successive lines within the column of pixel samples comprising the adjacent pixels 201b, . . . , 212b. For example, amplitude differences may be calculated for each pair of pixels (201b-202b), (202b-204b), (204b-206b), (206b-208b), (208b-210b), and (210b-212b). The amplitude differences may be calculated as differences in chrominance and/or luminance of the sample pixels 201b, . . . , 212b. In an exemplary aspect of the invention, if an amplitude difference is negative, a difference polarity of −1 may be assigned to the corresponding pixel pair. Similarly, if an amplitude difference is positive, a difference polarity of 1 may be assigned to the corresponding pixel pair. A polarity change count may then be determined for pixels 201b, . . . , 212b by calculating the number of subsequent difference polarity changes for each pair of pixels selected from pixels 201b, . . . , 212b. Therefore, the PCC result for any given column of 7 sample pixels, such as pixels 201b, . . . , 212b, may be one of 6 possible values: $\{0, 1, 2, 3, 4, 5\}$. When counting the number of polarity changes, only consecutive polarity changes, which include the current pixel sample, may be counted.

With regard to luminance amplitude, the general trend of the samples within the column of pixels 201b, . . . , 212b is downward or darker, for example, while a distinct pattern of alternating up and down relative values may be present. In one embodiment of the invention, a polarity change count for pixel samples 201b, . . . , 212b may be utilized to detect an up and/or down pattern, which may be indicative of weave artifacts. Accordingly, this may be utilized to distinguish weave artifacts from valid details. The presence of weave artifacts, for example, may be indicated by alternating difference polarities for each pixel pair for the plurality of pixels 201b, . . . , 212b. As a result, with regard to the 7 selected pixel samples 201b, . . . , 212b, there may be a total of 6 difference polarities and a maximum of 5 consecutive alternations in the difference polarity values. Since there are a total of five consecutive changes in the polarity of differences for pixels 201b, . . . , 212b, the polarity change count is 5.

Referring to FIGS. 2A and 2B, a high PCC calculated by the PCC calculation block 208a, may be indicative of bad weave artifacts and may result in high spatial/weave blend control value 230a calculated by the blend control calculation block 222a. Furthermore, high spatial/weave blend control value 230a may result in utilizing spatial interpolation as a method for deinterlacing interlaced video fields from the current field and the adjacent field. Similarly, a low PCC may be indicative of lack of bad weave artifacts and, therefore, weaving may be selected as a method for deinterlacing interlaced video fields from the current field and the adjacent field. In one embodiment of the invention, a calculated PCC for a plurality of weaved pixels may be considered as a high PCC, if the calculated PCC is greater than one half the maximum possible PCC. Similarly, a calculated PCC for a plurality of weaved pixels may be considered as a low PCC, if the calculated PCC is less than one half the maximum possible PCC.

In another embodiment of the invention, an average difference value may be calculated, representing the difference in amplitude between the samples in the column of samples from the current field and the samples in the column of samples from an alternate field. Referring again to FIG. 2B, for example, an average difference value 203b may be calculated as the average of the values of samples 201b, 204b, 208b, and 212b minus the average of the values of samples 202b, 206b, and 210b. A resulting average difference value 203b may be combined with a PCC value to form a modified weighting value which may be used to control a weighting of a weave value and a spatial interpolation value. A small average difference may indicate that a weave artifact may be less visible, and a large average difference may indicate that a weave artifact may be more visible.

A method and system for deinterlacing using polarity change count (PCC), including an example of a combination of a weighting value, based on a PCC value, with an average difference value to create a modified weighting value, is further described in U.S. patent application Ser. No. 11/254,262, filed Oct. 20, 2005, which is incorporated herein by reference in its entirety.

Figure 2C:
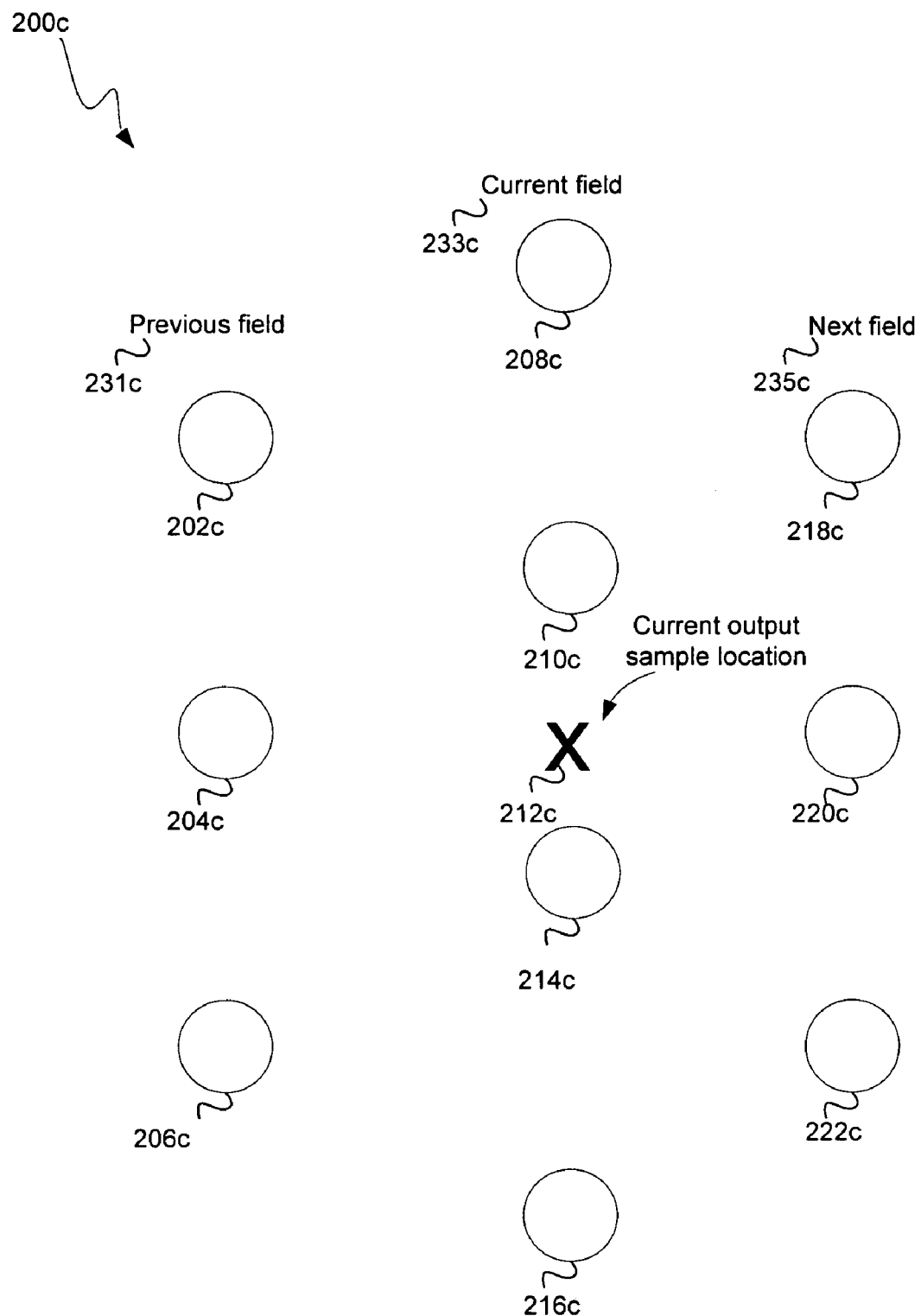
FIG. 2C is a diagram illustrating exemplary selection of pixel samples from current and adjacent fields for a two-field difference calculation, in accordance with an embodiment of the invention.

FIG. 2C is a diagram illustrating exemplary selection of pixel samples from current and adjacent fields for a two-field difference calculation, in accordance with an embodiment of the invention. Referring to FIG. 2C, pixel samples 202c, ..., 216c may be selected for calculation of a two-field difference value and may comprise pixels from two adjacent weaved fields, such as the current field 233c and the previous field 231c. After weaving, fields 231c and 233c may form a video frame comprising vertically adjacent pixels 202c, ... 216c selected from the adjacent fields 231c and 233c. For example, pixel samples 210c and 214c may be selected from the current field 233c so that pixel samples 210c and 214c may be located immediately above and below, respectively, to a current output sample location 212c within the current field 233c. Pixel samples 208c and 216c may also be selected from the current field 233c so that pixel sample 208c may be located immediately above pixel sample 210c, and pixel sample 216c may be located immediately below pixel sample 214c.

In addition to pixel samples 208c, ..., 216c selected from the current field 233c, corresponding pixel samples 202c, ..., 206c may be selected from the previous field 231c for calculation of the two-field difference value. For example: e, pixel sample 204c may be selected from the previous field 231c so that pixel sample 204c corresponds to the current output sample 212c. Pixel samples 202c and 206c may be selected from the previous field 231c so that pixel samples 202c and 206c may be located immediately above and below, respectively, to the pixel sample 204c within the previous field 231c.

The pixels samples 202c, ..., 206c may correspond to the plurality of pixel samples 204a from an alternate field, and pixel samples 208c, ..., 216c may correspond to the plurality of pixel samples 202a in a current field, as illustrated in FIG. 2A with regard to calculation of the two-field difference blend control value 226a.

In an exemplary aspect of the invention, a two-field difference value may be calculated for pixels 202c, ..., 216c from the previous field 231c and the current field 233c. Since the vertical positions of pixels within the previous field 231c are different from the vertical positions of pixels within the current field 233c, a filter may be applied to shift the vertical phase of pixels 202c, ..., 206c so that pixels 202c, ..., 206c may be aligned with pixels 208c, ..., 216c within the current field 233c. Alternatively a filter may be applied to shift the vertical phase of the pixels within the current field to align vertically with the pixels within the previous field. Alternatively filters may be applied to shift the vertical phases of the pixels of both the current field and the previous field such that the results are vertically aligned. A two-field difference value may then be determined by calculating a difference between the current field 233c and the previous field 231c utilizing the phase-aligned filtered results from pixels 202c, ..., 216c. In one embodiment of the invention, low-pass filter functions, for example, may be performed on both the current field 233c and the previous field 231c, and the low-pass filter functions may comprise the vertical phase shift function applied to the respective pixels from the two fields. A four-tap filter, for example, may be utilized to filter and phase-shift the four pixel samples 208c, ..., 216c within the current field 233c, and a three-tap filter may be utilized to filter the three pixels samples 202c, ..., 206c within the previous field 231c. A two-field difference may then be determined by calculating a difference between the filtered pixel values, for example, of pixels 208c, ..., 216c within the current field 233c and corresponding phase-aligned filtered pixels 202c, ..., 206c within the previous field 231c. An absolute value function may be applied to the two-field difference.

The two-field difference value may be utilized to measure motion between adjacent fields, such as the current field 233c and the previous field 231c. The absolute value of the two-field difference value may be so utilized. Accordingly, the two-field difference value may be utilized to help determine whether to deinterlace video fields 231c and 233c utilizing weaving, if the two-field difference value is low, or spatial interpolation, if the two-field difference value is high, or the two-field difference value may be utilized at least in part to determine the degree to which spatial interpolation and weaving are used to deinterlace video fields 231c and 233c. In one embodiment, measures other than the two-field difference value, such as PCC or static region detection, may indicate a different determination of the utilization of weaving and spatial interpolation from the indication provided by the two-field difference value, and the amounts of weaving and spatial interpolation utilized may in some cases more closely resemble the determinations resulting from such other measures than that from the two-field difference value. The mapping functions and the sum and clip functions illustrated in FIG. 2A may affect such a result.

In one embodiment of the invention, a two-field difference value may be calculated for each of luminance (Y), chrominance-red (Cr), and chrominance-blue (Cb) components of pixel samples within a current and an adjacent field. A total two-field difference value may then be calculated utilizing the two-field difference values calculated for the luminance, chrominance-red, and chrominance-blue components of the pixel samples within the current and the adjacent field.

Even though the two-field difference value as described previously is calculated utilizing the current field 233c and the previous field 231c, the present invention may not be so limited and a next adjacent field 235c may be utilized in place of the previous field 231c, or, in the alternative, both the next adjacent field and the previous field may be utilized. For example, pixel samples 218c, ..., 222c may be selected from the next field 235c, adjacent to the current field 231c, for calculation of the two-field difference value. In this regard, pixel sample 220c may be selected from the next field 235c so that pixel sample 220c corresponds to the current pixel sample 212c. Pixel samples 218c and 222c may be selected from the next field 235c so that pixel samples 218c and 222c may be located immediately above and below, respectively, to the pixel sample 220c within the next field 235c.

In another embodiment of the invention, multiple two-field difference values may be calculated using the current field 233c as well as the previous field 231c and the next adjacent field 235c. Furthermore, such multiple two-field difference values may be used along with other measures, for example, to decide which field to use for weaving, e.g. at each output sample, or how to combine samples from both alternate fields for weaving.

In another embodiment of the invention, a two-field difference value may be calculated for a plurality of horizontally adjacent columns of pixel samples within a current field 233c and an adjacent field, such as a previous field 231c or a next field 235c. For example, two columns of pixel samples, a previous and a next pixel column, may be selected from the current field 233c so that the selected two columns of pixel samples are adjacent to the column of pixel samples comprising pixels 208c, . . . , 216c. Corresponding previous and next pixel columns may be selected from an adjacent field and a two-field difference value may be calculated for each pair of corresponding pixel columns within the current field 233c and the adjacent field 231c or 235c. A total two-field difference value may be calculated based on the two-field difference values for each pixel column selected from the current field 233c.

Referring to FIGS. 2A and 2C, a high two-field difference value calculated by the two-field difference calculation block 210a, may be indicative of motion, such as visible vertical motion, for example, and potential bad weave artifacts, and may result in a high spatial/weave blend control value 230a calculated by the blend control calculation block 222a. Furthermore, a high spatial/weave blend control value 230a may result in utilizing spatial interpolation as a method for deinterlacing interlaced video fields from the current field and one or more adjacent fields. Similarly, a low two-field difference value may be indicative of a lack of bad weave artifacts from motion and, therefore, weaving may be selected as a method for deinterlacing interlaced video fields from the current field and one or more adjacent fields.

A method and system for adjacent field comparison, or two-field difference detection is further described in U.S. patent application Ser. No. 11/272,116, filed Nov. 10, 2005, which is incorporated herein by reference in its entirety.

Figure 2D:
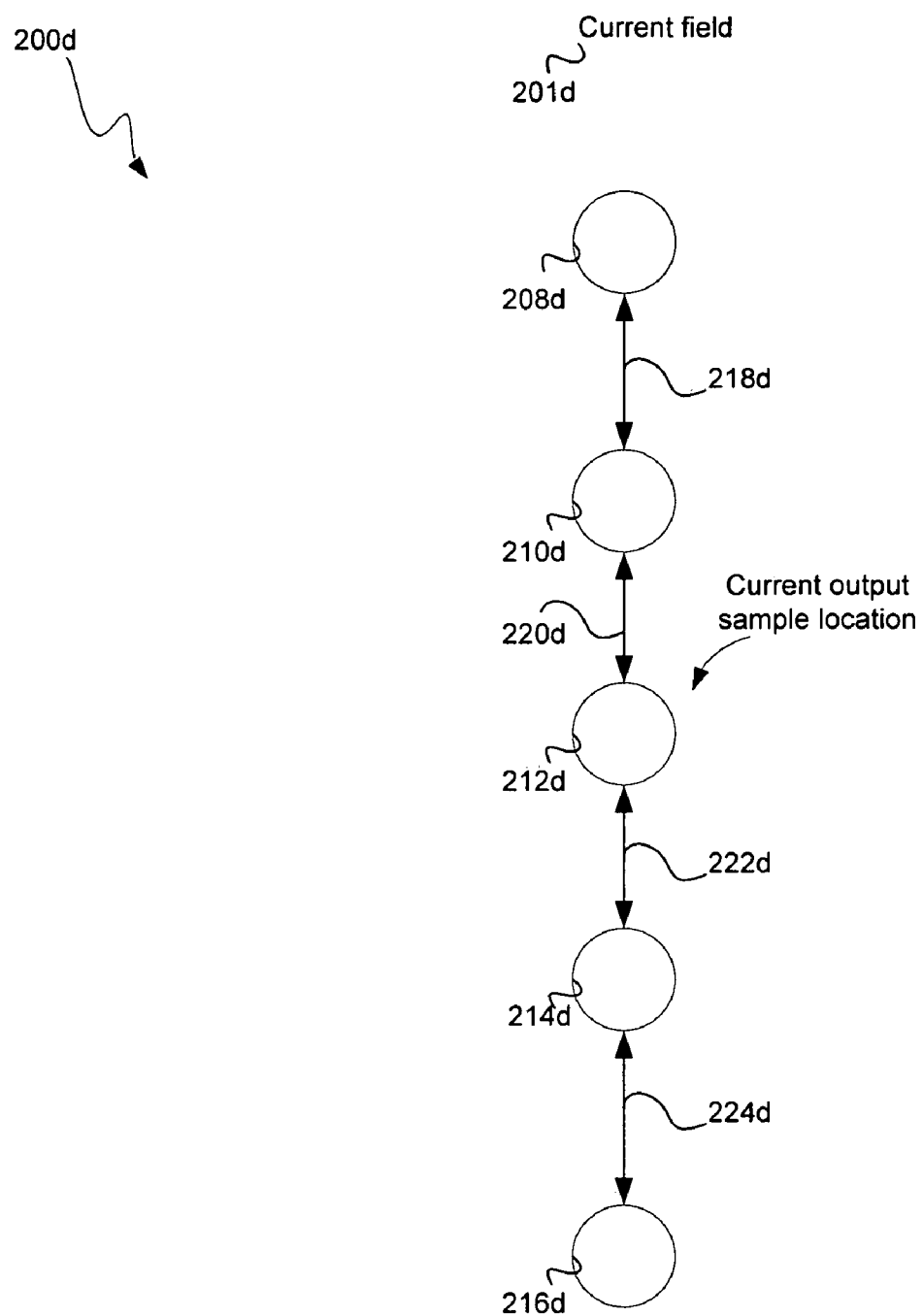
FIG. 2D is a diagram illustrating exemplary selection of pixel samples for vertical gradient detection within a current field, in accordance with an embodiment of the invention.

FIG. 2D is a diagram illustrating exemplary selection of pixel samples for vertical gradient detection within a current field, in accordance with an embodiment of the invention. Referring to FIG. 2D, samples 208dd, . . . , 216dd may be selected for calculation of a vertical gradient centered at the current output sample location 212d. The vertical gradient may be utilized as a measure of vertical detail, which can be combined with an inter-field, or two-field difference, for example. In this regard, the combined measure comprising a vertical gradient may indicate the degree to which motion, such as visible vertical motion, for example, may exist, which may result in visible bad weave artifacts. Samples 210dd and 214dd may be selected from the current column in the current field 201d so that pixel samples 210dd and 214dd may be located immediately above and below, respectively, to a current output sample location 212d within the current field 201d. Pixel samples 208dd and 216dd may also be selected from the current field 201d so that pixel sample 208dd may be located immediately above pixel sample 210dd, and pixel sample 216dd may be located immediately below pixel sample 214dd. The pixels samples 208dd, . . . , 216dd may correspond to the plurality of pixel samples 202a from the current field, as illustrated in FIG. 2A with regard to calculation of the two-field difference blend control value 226a.

Similarly, pixels within the previous columns 1 and 2 and the subsequent columns 3 and 4 within the current field 201d may also be selected for calculation of the vertical gradient. For example, pixels 208db, . . . , 216db may be selected from the previous column 1, and pixels 208dc, . . . , 216dc may be selected from the previous column 2. Furthermore, pixels 208de, . . . , 216de may be selected from the subsequent column 4, and pixels 208df, . . . , 216df may be selected from the subsequent column 5.

Referring to FIGS. 2A and 2D, the vertical gradient detection block 212a may comprise a high pass filter in the vertical dimension. Furthermore, to increase sensitivity in the vertical direction and decrease sensitivity in the horizontal direction, the vertical gradient detection block 212a may also comprise a low pass filter in the horizontal direction. For example, the vertical gradient detection block 212a may use as few as two taps vertically, or it may use more taps. The high pass function may comprise a difference function, or it may comprise a more sophisticated function with a sharper response. If the vertical gradient detection block 212a uses 4 taps vertically, the vertical taps may utilize the same coefficient magnitude, such as 1, or they could be weighted. The horizontal low pass function may comprise an average function, or it may comprise another type of function. The vertical gradient detection block 212a may also be adapted to detect presence and magnitude of a vertical gradient by utilizing an absolute value function, such as "abs( )," for example.

In one embodiment of the invention, a 5 tap horizontal and 4 tap vertical gradient detection block 212a may utilize all 20 samples illustrated in FIG. 2D. In this regard, the vertical taps of the pixels in FIG. 2D may be weighted (1, 2, -2, -1) and the horizontal taps may be weighted (1, 2, 2, 2, 1). The present invention may not be limited by the number of horizontal and vertical taps, or by the coefficients used for weighting. A plurality of other coefficient values may be utilized with a different number of horizontal and/or vertical taps. In an exemplary embodiment of the invention, a 3 tap horizontal and 2 tap vertical gradient detection block 212a may utilize samples 210dc, 214dc, 210dd, 214dd, 210de, and 214de. In this regard, the vertical taps of the pixels in FIG. 2D may be weighted (1, -1) and the horizontal taps may be weighted (1, 2, 1), for example.

Referring to FIG. 2D, a weighted sum of the values of pixels 208dd, 210dd, 214dd and 216dd may be calculated for purposes of determining vertical gradient centered at the current output sample location 212d. The weighting may be performed by multiplying each of the pixel values by a respective coefficient (1, 2, -2, -1). For example, the sum may be $1*208d+2*210d-2*214d-1*216d$. The weighted sum may be referred to as sum_y_d, for example. The pixel value used for this calculation may be a luma component of each pixel, or alternatively it may be a chroma component of each pixel, such as Cb or Cr. A similar weighted sum for each of a plurality of horizontally adjacent columns of pixels, such as the pixels in columns 1, 2, 4 and 5 may be calculated. For example, pixels 208db, . . . , 216db may be selected from the previous column 1, pixels 208dc, . . . , 216dc may be selected from the previous column 2, pixels 208de, . . . , 216de may be selected from the subsequent column 4, and pixels 208df, . . . , 216df may be selected from the subsequent column 5.

In this regard, weighted sum, such as sum_y_b, may be calculated for column 1, similarly to sum_y_d but utilizing samples (208db, . . . , 216db). Similarly, weighted sum sum_y_c may be calculated utilizing samples (208dc, . . . , 216dc) in column 2. Weighted sum sum_y_e may be calculated utilizing samples (208de, . . . , 216de) in column 4, and weighted sum sum_y_f may be calculated utilizing samples (208df, . . . , 216df) in column 4. A weighted sum of these five weighted sums may then be calculated utilizing coefficients (1, 2, 2, 2, 1) as sum_y_total=$1*sum\_y\_b+2*sum\_y\_c+2*sum\_y\_d+2*sum\_y\_e+1*sum\_y\_f$. The resulting weighted sum sum_y_total may represent a vertical gradient centered at the current output sample location 212d, measuring the component, for example luma, used in the foregoing calculations. In another embodiment of the invention, additional vertical gradient values may be calculated similarly measuring other components of the pixels, for example Cb or Cr. For example, sum_Cb_total may be calculated in a similar fashion to sum_y_total, however using the Cb component of the respective pixels in the calculations. Similarly, for example sum_Cr_total may be calculated in a similar fashion to sum_y_total, however using the Cr component of the respective pixels in the calculations. In another embodiment of the invention, the calculations described herein may be performed in a different order. For example, a weighted sum in the horizontal dimension may be calculated before calculating a weighted sum in the vertical dimension.

In another embodiment of the invention, the absolute value of sum_y_total may be calculated. The resulting value may be referred to as vert_grad_y, for example, and may be utilized as an estimate of the vertical luma gradient in the vicinity of the current output sample location. The value of vert_grad_y may be utilized to estimate the presence of horizontal, or near-horizontal, edges in the content in the current field 201d. The value of vert_grad_y may also be utilized to control the calculation of a blending control as part of a de-interlacing method or system, in accordance with an embodiment of the invention.

Alternatively, the absolute values of the values sum_Cb_total and sum_Cr_total may also be calculated, and the resulting values may be referred to as vert_grad_Cb and vert_grad_Cr, respectively. The values of vert_grad_Cb and vert_grad_Cr may be utilized as estimates of the vertical Cb gradient and the vertical Cr gradient, respectively. A weighted sum of vert_grad_y, vert_grad_Cb and vert_grad_Cr, for example, may be calculated. The resulting sum may be referred to as vert_grad_total, for example. The value of ver_grad_total may be utilized to control the calculation of a blending control as part of a de-interlacing method or system, in accordance with an embodiment of the invention.

The two-field difference value received from the two-field difference calculation block 210a and the vertical gradient values from the vertical gradient calculation block 212a may be combined by the mapping block 218a to generate a two-field difference blend control value 226a. The two-field difference blend control value 226a may be indicative of an amount of motion, such as visible vertical motion, for example, between pixels between the current field and the adjacent field, and may be utilized in the calculation of the blend control value 230a.

A vertical gradient value calculated by the vertical gradient calculation block 212a, may be indicative of visible detail which may be sensitive to motion, such as vertical motion, for example, and may result in bad weave artifacts in the presence of motion. A vertical gradient value may be combined with a measure of motion, for example a two-field difference value to produce a blend control value, which may result in a high spatial/weave blend control value 230a calculated by the blend control calculation block 222a. Furthermore, high spatial/weave blend control value 230a may result in utilizing spatial interpolation as a method for deinterlacing interlaced video fields from the current field and at least one adjacent field. Similarly, a low gradient value may be indicative of a lack of visible detail which may result in bad weave artifacts in the presence of motion and, therefore, weaving may be selected as a method for deinterlacing interlaced video fields from the current field 201d and at least one adjacent field.

A method and system for vertical gradient detection in video processing is further described in U.S. patent application Ser. No. 11/270,999, filed Nov. 10, 2005, which is incorporated herein by reference in its entirety.

Figure 2E:
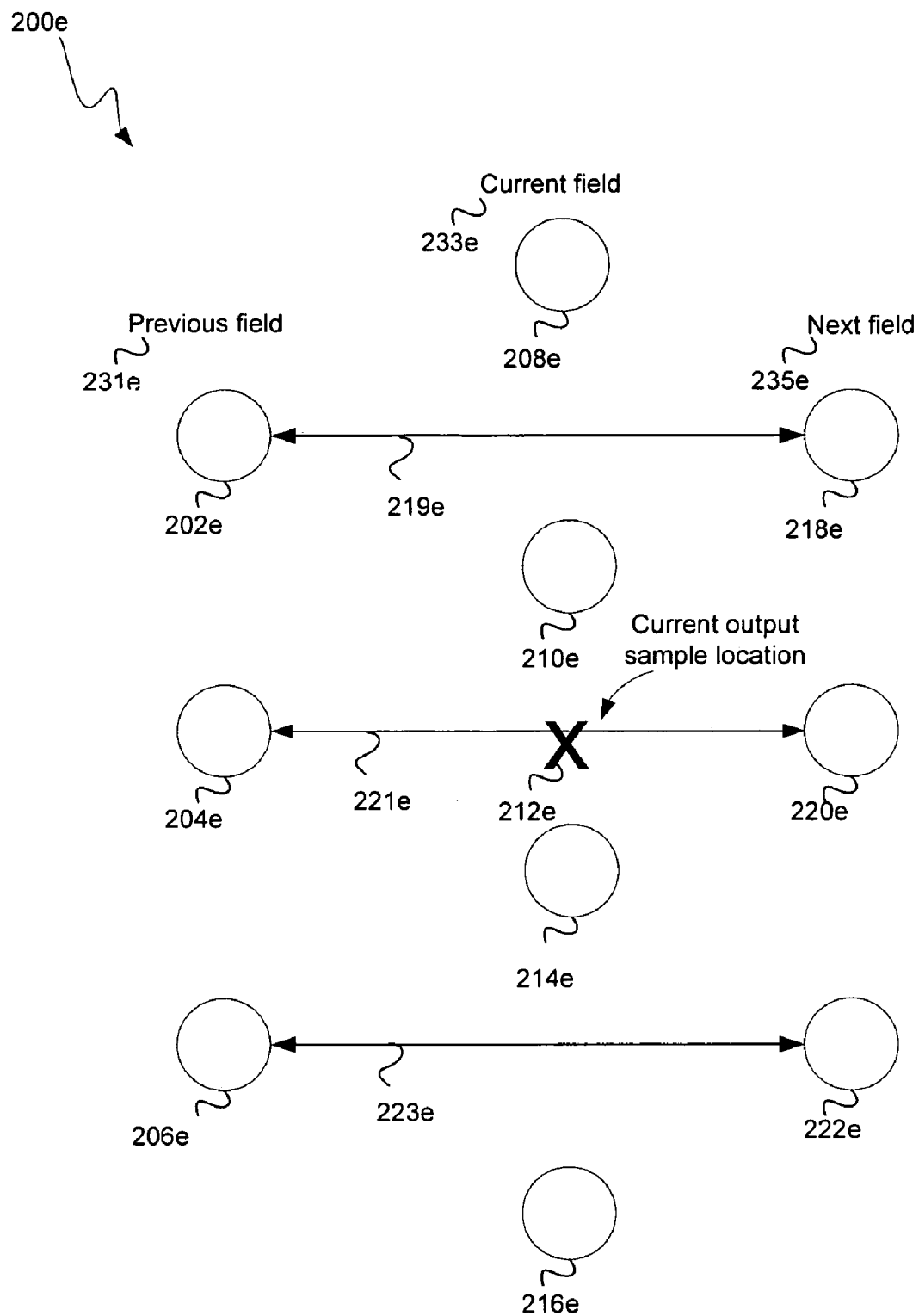
FIG. 2E is a diagram illustrating exemplary selection of pixel samples from previous and next fields for a static region detection calculation, in accordance with an embodiment of the invention.

FIG. 2E is a diagram illustrating exemplary selection of pixel samples from previous and next fields for a static region detection calculation, in accordance with an embodiment of the invention. Referring to FIG. 2E, pixel samples 202e, . . . , 222e may be selected for calculation of a static region indicator value and may comprise pixels from the previous field 231e and the next field 235e, which are adjacent to the current field 233e. After weaving, fields 231e and 233e may form a video frame comprising vertically adjacent pixels 202, . . . , 216 selected from the adjacent fields 231e and 233e. For example, pixel samples 210 and 214 may be selected from the current field 233e so that pixel samples 210 and 214 may be located immediately above and below, respectively, to a current output sample location 212 within the current field 233e. Pixel samples 208 and 216 may also be selected from the current field 233e so that pixel sample 208 may be located immediately above pixel sample 210, and pixel sample 216 may be located immediately below pixel sample 214. The pixels samples 202e, . . . , 206e may correspond to the plurality of pixel samples 204a from an alternate field, and pixel samples 218e, . . . , 222e may correspond to the plurality of pixel samples 206a in another alternate field, as illustrated in FIG. 2A with regard to calculation of the static region blend control value 228a.

Pixel samples 202e, . . . , 206e and 218e, . . . , 222e may be selected from the previous field 231e and the next field 235e, respectively, for calculation of the static region indicator value corresponding to pixel samples 208e, . . . , 216e selected from the current field 233e. For example, pixel samples 204e and 220e may be selected from the previous field 231e and the next field 235e so that pixel samples 204e and 220e correspond to the current output sample location 212e. Pixel samples 202e and 206e may be selected from the previous field 231e so that pixel samples 202e and 206e may be located immediately above and below, respectively, to the pixel sample 204e within the previous field 231e. Similarly, pixel samples 218e and 222e may be selected from the next field 235e so that pixel samples 218e and 222e may be located immediately above and below, respectively, to the pixel sample 220e within the next field 235e.

In an exemplary aspect of the invention, a static region indicator value may be calculated based on corresponding pixel pairs 202e-218e, 204e-220e, and 206e-222e for in-phase aligned pixels in the previous field 231e and the next field 235e, respectively. Since pixels 202e, . . . , 206e and 218e, . . . , 222e are aligned and in-phase, a static region indicator value may be calculated without phase adjustment filtering of pixels 202e, . . . , 206e or pixels 218e, . . . , 222e.

A static region indicator value may then be determined by initially calculating pixel differences between corresponding pixels in the previous field 231e and the next field 235e. For example, pixel difference 219e may be calculated for pixels 202e and 218e in fields 231e and 235e, respectively. Similarly, pixel difference 221e may be calculated for pixels 204e and 220e, and pixel difference 223e may be calculated for pixels 206e and 222e in the previous field 231e and the next field 235e, respectively. The static region indicator value may be calculated based on the determined pixel differences 219e, 221e, and 223e.

In one embodiment of the invention, the static region indicator value may be calculated as a weighted sum of the absolute values of the pixel differences 219e, 221e, and 223e. For example, a weight of 1 may be used for the absolute value of pixel differences 219e and 223e, and a weight of 2 may be used for the pixel difference 221e. Even though weight values of 1 and 2 are utilized, the present invention may not be so limited and other weight values may also be utilized for calculating the static region indicator value. For example, the static region indicator value may be calculated as a sum of the absolute values of the pixel differences 219e, 221e, and 223e, without utilizing explicit weighting. Furthermore, the static region indicator value may also be calculated based on a plurality of horizontally adjacent columns of pixels, for example three columns. The weighted sum may then be converted to a value within a range of (−1, 0), for example, via a non-linear function, such as a scaling function and/or a clipping function, or via a look-up table. The calculated static region indicator value may then be utilized to determine the presence of static regions between a plurality of adjacent fields, such as the previous field 231e, the current field 233e, and the next field 235e. Accordingly, the static region indicator value may be utilized at least in part to determine whether to deinterlace video fields 231e and 233e utilizing weaving, if the static region indicator value is −1 or close to −1, or spatial interpolation, if the static region indicator value is 0 or close to 0. In another embodiment of the invention, the static region indicator value may be one of a plurality of indicators which, when combined, may be used to control blending between weaving and spatial interpolation.

In one embodiment of the invention, a static region indicator value may be calculated for each of luminance (Y), chrominance-red (Cr), and chrominance-blue (Cb) components of pixel samples within a plurality of adjacent fields, such as a previous field, a current field, and a next field. A total static region indicator value may then be calculated utilizing the static region indicator values calculated for the luminance, chrominance-red, and chrominance-blue components of the pixel samples within the previous, current, and next fields. In another embodiment of the invention, differences from the plurality of components, such as Y, Cb and Cr, may be combined before calculating the static region indicator value. In this regard, the present invention may not be limited to Y, Cb and Cr components. The plurality of components may comprise RGB, YPrPb, or other types of components.

Referring to FIGS. 2A and 2E, a high static region indicator value calculated by the static region calculation block 214a, may be indicative of vertical or horizontal motion between pixels in adjacent fields and may result in high spatial/weave blend control value 230a calculated by the blend control calculation block 222a. Furthermore, high spatial/weave blend control value 230a may result in utilizing spatial interpolation as a method for deinterlacing interlaced video field from the current field and at least one adjacent field. Similarly, a low static region indicator value may be indicative of absence of motion between pixels in a plurality of adjacent fields, such as pixel samples 202a and 204a. In this regard, when the static region indicator value is low and there is no or little motion between pixels, weaving may be selected as a method for deinterlacing interlaced video fields from the current field and at least one adjacent field.

In one embodiment of the invention, the static region indicator value may be one of a plurality of measures which may be combined to produce an overall blend control value. The overall blend control value may be utilized to control the degrees to which weaving and spatial interpolation may be used for de-interlacing. In this regard, one or more of these measures may indicate one type of decision, such as an emphasis on weaving, while the overall blend control value may indicate a different decision, such as an emphasis on spatial interpolation, as a result of the combining of multiple measures.

A method and system for static region detection in video processing is further described in U.S. patent application Ser. No. 11/222,112, filed Nov. 10, 2005, which is incorporated herein by reference in its entirety.

Figure 3:
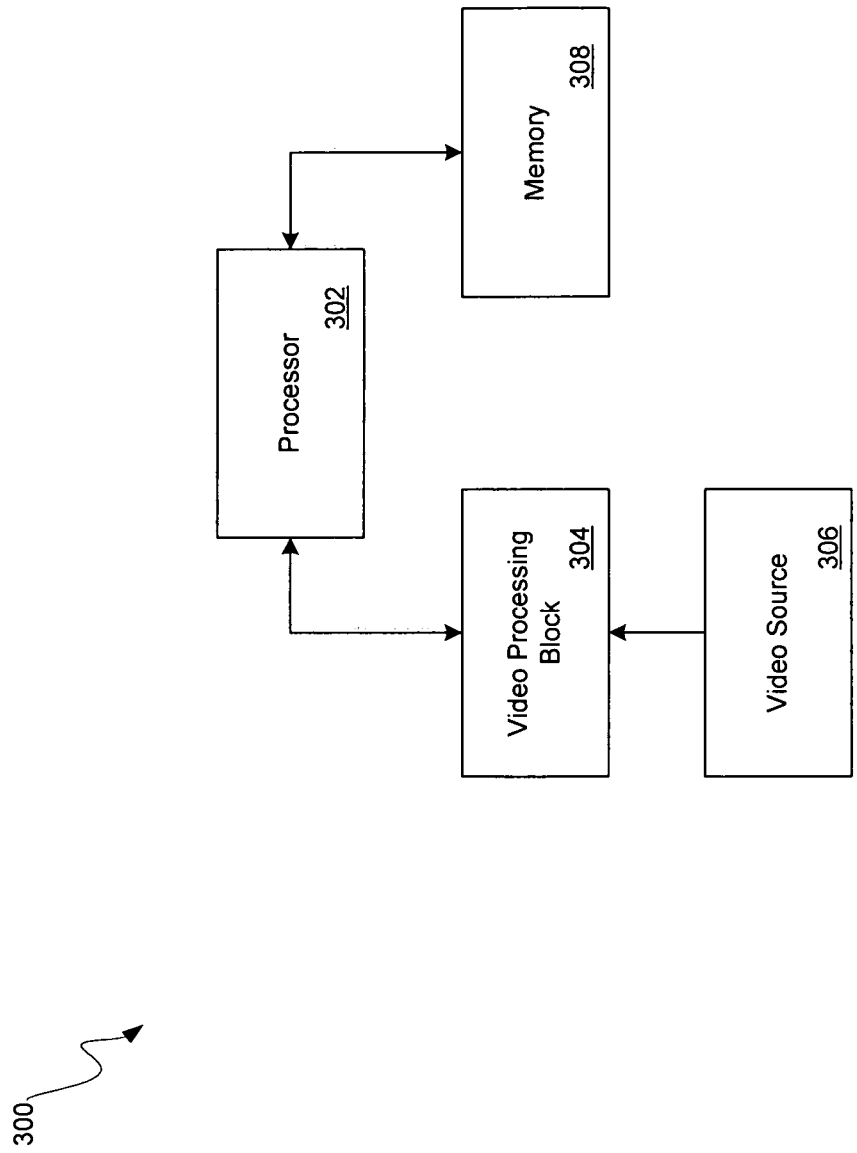
FIG. 3 is a block diagram of an exemplary system for deinterlacing utilizing blending of spatial interpolation and weaving, in accordance with an embodiment of the invention.

FIG. 3 is a block diagram of an exemplary system for deinterlacing utilizing blending of spatial interpolation and weaving, in accordance with an embodiment of the invention. Referring to FIG. 3, the exemplary system 300 may comprise a processor 302, a video processing block 304, memory 308, and a video source 306. The video source 306 may comprise suitable circuitry, logic, and/or code and may be adapted to communicate raw video stream data, for example, to the video processing block 304. The video processing block 304 may comprise suitable circuitry, logic, and/or code and may be adapted to process the raw video data received from the video source 306. For example, the video processing block 304 may be adapted to deinterlace interlaced video data received from the video source 306. In this regard, the video processing block 304 may be implemented as a specialized video processing chip, or core within a chip.

The processor 302 may comprise suitable circuitry, logic, and/or code and may be adapted to control processing of video information by the video processing block 304, for example. The processor 302 may comprise a system or a host processor, or a video processor such as a video processing chip or embedded video processor core. The video processor may be integrated in any device that may be utilized to generate video signals and/or display video. The memory 308 may be adapted to store raw or processed video data, such as video data processed by the video processing block 304. Furthermore, the memory 308 may be utilized to store code that may be executed by the processor 302 in connection with video processing tasks performed by the video processing block 304. For example, the memory 308 may store code that may be utilized by the processor 302 and the video processing block 304 for calculating a plurality of pixel motion indicators for a plurality of pixels in a current field and a corresponding plurality of pixels in at least one adjacent field. The calculated plurality of pixel motion indicators may be used to deinterlace interlaced video received from the video source 306.

The processor 302 may calculate a plurality of pixel motion indicators for a plurality of pixels, received via the video source 306, in a current field and a corresponding plurality of pixels in at least one adjacent field. The pixel motion indicators may indicate an amount of motion between the plurality of pixels. The processor 302 may blend the calculated plurality of pixel motion indicators to generate a blend control value that indicates an amount of weaving and spatial interpolation that is to be done for the plurality of pixels received from the video source 306. The processor 302 may deinterlace at least a portion of the plurality of pixels in the current field based on the generated blend control value.

Figure 4:
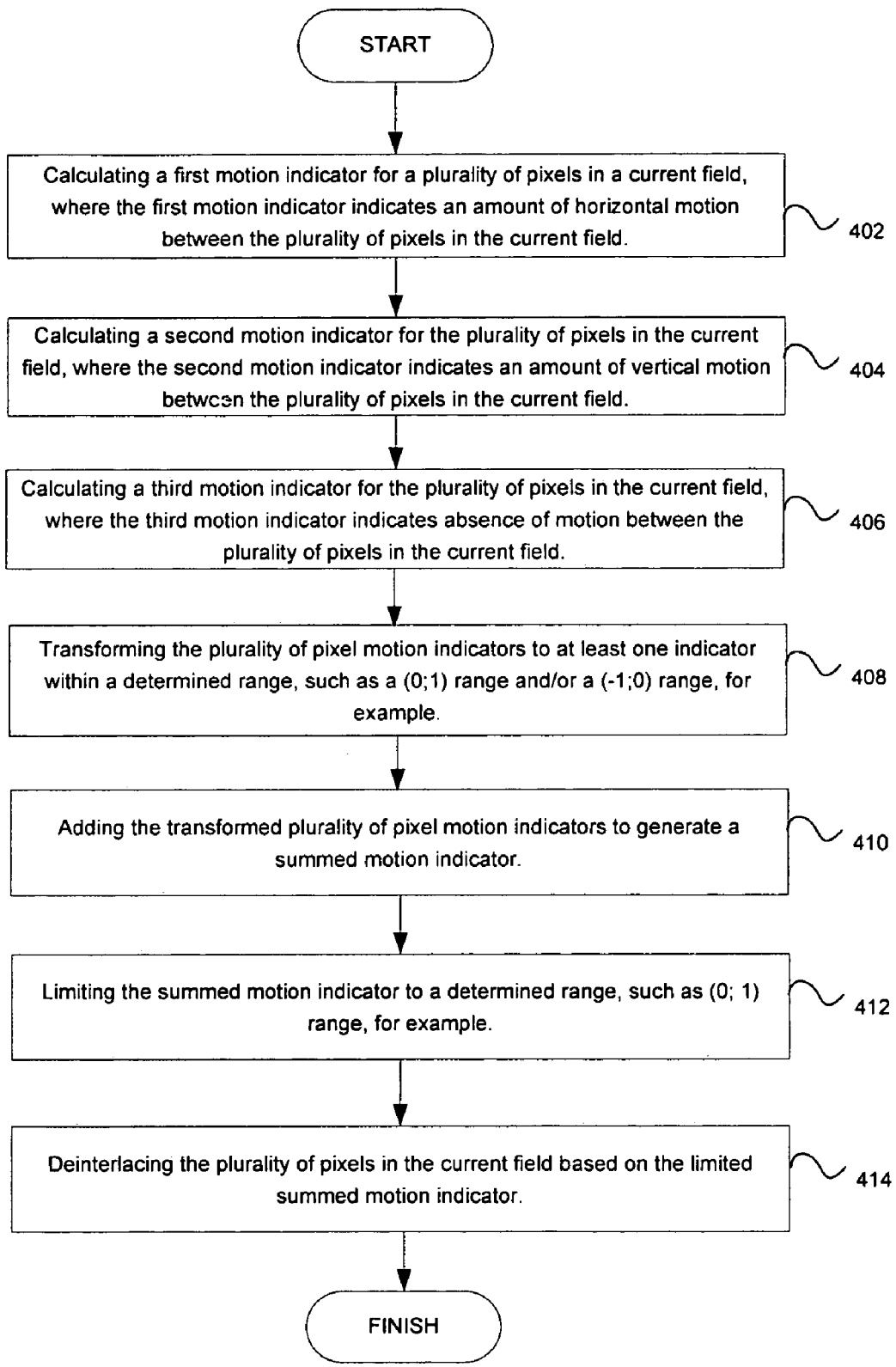
FIG. 4 is a flow diagram illustrating exemplary steps for processing video information, in accordance with an embodiment of the invention.

FIG. 4 is a flow diagram illustrating exemplary steps for processing video information, in accordance with an embodiment of the invention. Referring to FIGS. 2A and 4, at 402, a first motion indicator may be calculated for a plurality of pixels 202a in a current field and a corresponding plurality of pixels 204a in an adjacent field. The first motion indicator may indicate an amount of weave artifacts that are created, if the plurality of pixels 202a in the current field is woven with the plurality of pixels 204a in the adjacent field. At 404, a second motion indicator may be calculated by the two-field difference calculation block 210a and the vertical gradient calculation block 212a for the plurality of pixels 202a in the current field and the corresponding plurality of pixels 204a in the adjacent field. The second motion indicator may indicate an amount of motion, for example visible vertical motion, between the plurality of pixels in the current field and the corresponding plurality of pixels in the adjacent field. The second motion indicator may comprise a two-field difference blend control value and/or a vertical gradient value, for example, and may indicate an amount of motion of video content in the vicinity of the plurality of pixels, between the current field and the adjacent field.

At 406, a third motion indicator may be calculated by the static region calculation block 214a for the plurality of pixels 202a in the current field. The third motion indicator may comprise a static region indicator value, for example, and may indicate an absence of motion associated with the plurality of pixels in the current field. At 408, the plurality of pixel motion indicators may be transformed to indicators 224a, . . . , 228a within determined ranges, such as (0, 1) and/or a (−1 , 0), for example. At 410, the transformed plurality of pixel motion indicators 224a, . . . , 228a may be summed by the blend control calculation block 222a to generate a summed motion indicator, or a spatial/weave blend control. At 412, the summed motion indicator may be transformed by a non-linear function, such as a mathematical formula or a look-up table. The transformed summed motion indicator may be limited by the blend control calculation block 222a to a determined range, such as (0, 1), for example, to generate a blend control value 230a. At 414, a current output sample value may be generated based on the blend control value 230a.

Accordingly, aspects of the invention may be realized in hardware, software, firmware, or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system is typically determined primarily by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may means for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing video information, the method comprising:
  calculating a plurality of motion indicators for a plurality of pixels in a current field and at least one corresponding plurality of pixels in at least one adjacent field, wherein at least one of said plurality of motion indicators indicate an amount of weave artifacts that are created if said plurality of pixels in said current field are woven with said corresponding plurality of pixels in said at least one adjacent field;
  combining said calculated plurality of motion indicators to generate a blend control value that indicates an amount of weaving and spatial interpolation that is to be done for a current output sample value; and
  generating said current output sample value based on said generated blend control value.

2. The method according to claim 1, comprising calculating a first motion indicator for said plurality of pixels in said current field, wherein said first motion indicator indicates said amount of weave artifacts that are created if said plurality of pixels in said current field are woven with said corresponding plurality of pixels in said at least one adjacent field.

3. The method according to claim 2, wherein said first motion indicator comprises a polarity change count (PCC) value.

4. The method according to claim 1, comprising calculating a second motion indicator for said plurality of pixels in said current field, wherein said second motion indicator indicates an amount of motion between said current field and said adjacent field.

5. The method according to claim 4, wherein said second motion indicator comprises one or both of a two-field difference indicator and/or a vertical gradient indicator.

6. The method according to claim 1, comprising calculating a third motion indicator for said plurality of pixels in said current field, wherein said third motion indicator indicates absence of motion between said adjacent field and a second adjacent field that is adjacent to said current field.

7. The method according to claim 6, wherein said third motion indicator comprises a static region indicator.

8. The method according to claim 1, comprising transforming said plurality of pixel motion indicators to at least one indicator within one or both of a first determined range and/or a second determined range.

9. The method according to claim 8, comprising adding said transformed plurality of pixel motion indicators to generate a summed motion indicator.

10. The method according to claim 9, comprising generating a current output sample value, based on said summed motion indicator.

11. A system for processing video information, the system comprising:
  at least one processor that calculates a plurality of motion indicators for a plurality of pixels in a current field and at least one corresponding plurality of pixels in at least one adjacent field, wherein at least one of said plurality of motion indicators indicate an amount of weave artifacts that are created if said plurality of pixels in said current field are woven with said corresponding plurality of pixels in said at least one adjacent field;

said at least one processor combines said calculated plurality of motion indicators to generate a blend control value that indicates an amount of weaving and spatial interpolation that is to be done for a current output sample value; and said at least one processor generates said current output sample value based on said generated blend control value.

12. The system according to claim 11, wherein said at least one processor calculates a first motion indicator for said plurality of pixels in said current field, and wherein said first motion indicator indicates said amount of weave artifacts that are created if said plurality of pixels in said current field are woven with said corresponding plurality of pixels in said at least one adjacent field.

13. The system according to claim 12, wherein said first motion indicator comprises a polarity change count (PCC) value.

14. The system according to claim 11, wherein said at least one processor calculates a second motion indicator for said plurality of pixels in said current field, wherein said second motion indicator indicates an amount of motion between said current field and said adjacent field.

15. The system according to claim 14, wherein said second motion indicator comprises one or both of a two-field difference indicator and/or a vertical gradient indicator.

16. The system according to claim 11, wherein said at least one processor calculates a third motion indicator for said plurality of pixels in said current field, and wherein said third motion indicator indicates absence of motion between said adjacent field and a second adjacent field that is adjacent to said current field.

17. The system according to claim 16, wherein said third motion indicator comprises a static region indicator.

18. The system according to claim 11, wherein said at least one processor transforms said plurality of pixel motion indicators to at least one indicator within one or both of a first determined range and/or a second determined range.

19. The system according to claim 18, wherein said at least one processor adds said transformed plurality of pixel motion indicators to generate a summed motion indicator.

20. The system according to claim 19, wherein said at least one processor generates a current output sample value, based on said summed motion indicator.

* * * * *